May 6, 1969   A. WINKLER   3,442,580
MOTION PICTURE CAMERA OR PROJECTOR FOR FILM WITH SOUND TRACK
Filed April 28, 1966
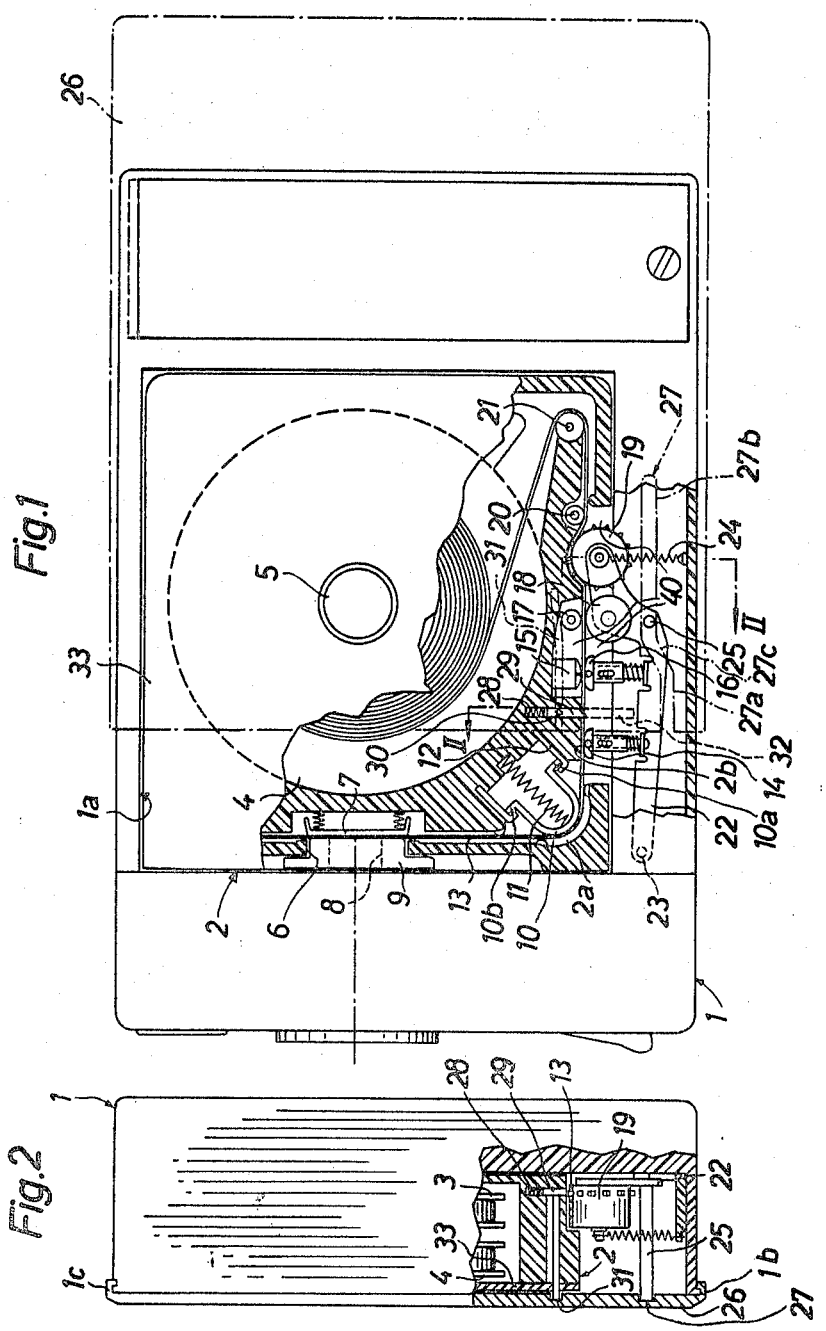
INVENTOR.
ALFRED WINKLER
BY Michael S. Striker
Attorney United States Patent Office 3,442,580
Patented May 6, 1969

3,442,580
MOTION PICTURE CAMERA OR PROJECTOR FOR FILM WITH SOUND TRACK
Alfred Winkler, Munich, Germany, assignor to Agfa-Gevaert Aktiengesellschaft, Leverkusen, Germany
Filed Apr. 28, 1966, Ser. No. 546,030
Claims priority, application Germany, May 3, 1965, A 49,084
Int. Cl. G03b 31/02
U.S. Cl. 352—29                                                              4 Claims

ABSTRACT OF THE DISCLOSURE

A motion picture camera or projector which comprises a housing whose chamber removably accommodates a film cartridge provided with a film channel including two mutually inclined portions, with a window adjacent to one of the channel portions, and with a cutout adjacent to the other channel portion. The cartridge accommodates coaxial supply and takeup spools and a pressing plate which urges the film against the window. A sound head which is mounted in the housing extends into the cutout of the cartridge and the latter further comprises a detent which engages the film in the channel at a point which is distant from the window when the cartridge is removed from the housing. A disengaging device automatically disengages the detent from the film when the cartridge is properly inserted into and sealed in the chamber.

---

The present invention relates to motion picture cameras and motion picture projectors in general, and more particularly to improvements in motion picture cameras or motion picture projectors which utilize roll film with a sound track. Still more particularly, the invention relates to improvements in the construction of cartridges which accommodate roll film with sound track and wherein the supply and takeup spools are preferably rotatable about a common axis.

It is an important object of the present invention to provide a film cartridge which is constructed and assembled in such a way that the supply of film therein is automatically threaded into the motion picture camera or into a motion picture projector when the cartridge is properly inserted into and is sealed in the chamber provided therefor in the camera or projector.

Another object of the invention is to provide a motion picture camera or a motion picture projector which can receive a cartridge of the just outlined characteristics and wherein the film produces a minimum of noise when the camera or projector is in actual use.

A further object of the invention is to provide a cartridge for roll film with sound track wherein the length of looped film between the gate and the sound head is extremely short and wherein the length of such loop may be selected with utmost accuracy in response to proper insertion of the cartridge into the corresponding chamber of a motion picture camera or motion picture projector.

An additional object of the invention is to provide a very simple, compact and reliable loop former or deflector for use in a film cartridge of the above outlined character.

A concomitant object of the invention is to provide a motion picture camera or a motion picture projector for use with the improved film cartridge and to provide the camera or projector with automatic means for properly engaging and guiding the film in response to proper insertion and sealing of the cartridge in the housing of the motion picture camera or projector.

Still another object of the invention is to provide a motion picture camera or a motion picture projector wherein the length of the film loop between the gate and the sound head need not exceed the combined length of eighteen film frames.

A further object of the instant invention is to provide a film cartridge which can be readily loaded by persons having little skill and wherein each of a series of consecutively inserted bodies of roll film may be installed with the same degree of accuracy.

Briefly stated, one feature of my present invention resides in the provision of a motion picture camera or a motion picture projector for use with roll film having a sound track. The improved structure comprises a housing defining a chamber, a film cartridge removably and sealably received in the chamber and having a film channel including two mutually inclined portions, a window adjacent to one portion of the film channel, and a cutout or recess adjacent to the other portion of the channel, coaxial film supply and takeup spools rotatably mounted in the cartridge, a pressing plate mounted in the cartridge and arranged to urge the film coming from the supply spool and entering the first portion of the film channel against the window, and a sound head mounted in the housing and extending into the cutout of the cartridge. The two portions of the film channel are preferably located in planes which make an angle of substantially 90 degrees with each other and the cartridge is provided with a yieldable loop former which is installed in the corner zone between the two portions of the film channel to form in the film extending through the film channel a loop of predetermined length. The loop former is preferably biased by a suitable resilient element so that it normally tends to assume a position of maximum penetration into the film channel, and the width of the film channel (at least in the region of the loop former) is such that the pulsating propagation of film in the channel may proceed while the loop former assumes a position of maximum penetration.

The improved structure further comprises detent means for normally engaging and holding the film in the film channel, at least when the cartridge is removed from its chamber, and automatic or manually operated disengaging means for the detent means. The aforementioned cutout may further receive portions of one or more film transporting sprockets as well as a sound wheel and one or more brakes and presser devices and guide rollers for the film.

The novel features which are considered as characteristic of the invention are set forth in particular in the appended claims. The improved motion picture camera or projector itself, however, both as to its construction and its mode of operation, together with additional features and advantages thereof, will be best understood upon perusal of the following detailed description of a specific embodiment with reference to the accompanying drawings, in which:

FIG. 1 is a somewhat schematic side elevational view of a motion picture camera which embodies one form of my invention, the cartridge being partly broken away; and FIG. 2 is an end elevational view of the camera as seen from the right-hand side of FIG. 1, with portions of the camera housing and cartridge shown in section substantially as seen in the direction of arrows from the line II—II of FIG. 1.

Referring to the drawings in detail, FIG. 1 shows a motion picture camera whose housing 1 defines a chamber 1a for a film cartridge or cassette 2. The cartridge 2 accommodates a film supply spool or reel 3 (see FIG. 2) and a film takeup spool or reel 4. The two reels are mounted on a common shaft 5. Coming from the supply reel 3, the film 13 is caused to pass along the inner side of a window 6 and is pressed against this window by a spring-biased pressing plate 7. The camera housing 1 itself is provided with a gate 9 having an opening 8 which registers with the window 6 when the cartridge 2 is properly inserted into the chamber 1a. The gate 9 lifts the film 13 off the window 6 so that the film frame which is located directly behind the opening 8 is then biased by the plate 7 against a fixed portion of the camera proper rather than against a portion of the cartridge.

On its way beyond the window 6 and opening 8, the film 13 is trained around a loop former or deflector 10 which resembles a U-shaped body and whose free end portions 10a, 10b are bent outwardly and abut against a sheet metal retainer 12 of the cartridge 2 under the bias of a helical expansion spring 11. The angle-shaped film channel 2a defined by the cartridge 2 has such a width (at least in the region of the deflector 10) that the film 13 can move inwardly (against the bias of the spring 11 when the end portions 10a, 10b abut against the retainer 12) and that the film 13 can also move away from the convex surface of the deflector 10 when the latter penetrates deepest into the channel 2a. In other words, the loop formed by the film 13 along the convex outer side of the deflector 10 can be lengthened or shortened by the length of a film frame so as to compensate for intermittent advance of film in the region of the window 6.

Going on from the deflector 10, the film 13 is led along a guide surface 2b which is provided on the cartridge 2 and is located opposite a brake shoe 14. The film then advances along a sound head 15 which latter is mounted in the housing 1 and is located opposite a spring-biased presser member 16. The sound head 15 is followed by a sound wheel 17 which is also mounted in the housing 1, and the film 13 passing along the sound wheel 17 is pressed thereagainst by a presser roll 18. The sound wheel 17 is driven by the motor of the camera in a manner known per se, for example, through a suitable mass or weight, so that it rotates at a constant speed.

The means for transporting the film 13 comprises a sprocket 19 whose teeth extend into the perforations of the film. The sprocket 19 is driven by a coaxially mounted gear (not shown) which receives motion from the motor of the motion picture camera. After moving past the sprocket 19, the film 13 is trained around guide rollers 20, 21 and is then led to the takeup spool 4 to be connected to the core of this spool in a manner well known from the art of film cartridges. The takeup spool 4 is coupled with the film transporting mechanism through the intermediary of a suitable friction clutch (not shown), and the supply spool 3 is braked so that the film extending between the spools 3 and 4 is maintained under requisite tension.

The spring-biased brake shoe 14, the spring-biased presser member 16, the presser roll 18, and the toothed sprocket 19 are mounted on a carrier here shown as a rockable lever 22 which is fulcrumed on a pin 23 carried by the housing 1. The lever 22 is biased by a spring 24 which tends to move it away from the cartridge 2 and to thereby move the parts 14, 16, 18 and 19 away from contact with the adjoining portion of the film 13. The lever 22 carries a follower pin 25 which tracks a cam 27 provided on a slidable cover 26 of the housing 1. The cover 26 is guided by rails 1b, 1c of the housing 1 and seals the chamber 1a when moved to closing position. The cam 27 on the cover 26 comprises a first end portion 27a which is distant from the cartridge 2 and a second end portion 27b which is nearer to the properly inserted cartridge. The two end portions 27a, 27b are connected by an intermediate portion 27c. When the cover 26 is being moved to closing position and the follower pin 25 reaches the intermediate portion 27c of the cam 27, the lever 22 begins to rock in a counterclockwise direction, as viewed in FIG. 1. The aforementioned parts 14, 16, 18 and 19 which are mounted on the lever 22 then extend into a suitable cutout or recess 40 of the cartridge 2 and begin to move toward the adjoining portion of the film 13.

In order to make sure that the length of the film 13 between the pressing plate 7 and the sound head 15 remains unchanged (despite the fact that the sprocket 19 is being moved toward the film), the cartridge 2 further comprises a detent pin 29 which is biased by a spring 28 and can enter the perforations of the film 13. The detent pin 29 carries a disengaging pin 30 which also constitutes a follower and can track a second disengaging cam 31 on the cover 26. The configuration of the cam 31 is such that the detent pin 29 is disengaged from the perforated portion of the film 13 only at a time when the lever 22 (and hence the sprocket 19) is already rocked in a sense to move the sprocket toward the adjoining portion of the film. It is clear, however, that the detent pin 29 could be coupled directly to a disengaging or motion transmitting element 32 which is indicated by broken lines and that the disengaging element 32 could cooperate directly with the lever 22 when the latter performs the last stage of its rocking movement in response to closing of the cover 26.

In order to load the cartridge 2, its lid 33 is removed and the outwardly extending disengaging pin 30 is grasped by hand to move the detent pin 29 away from the perforated portion of the film 13. The operator then exerts a slight pull upon the film portion which is trained around the guide roller 21 to stretch the loop which extends around the deflector 10 because the film is biased by the pressing plate 7 which tends to urge it against the window 6. Thus, the film portion extending between the window 6 or opening 8 and the sound head 15 assumes a predetermined optimum length. The operator then releases the disengaging pin 30 so that the detent pin 29 can follow the bias of the spring 28 and enters the adjoining perforation. Consequently, the length of the looped film portion now remains unchanged, regardless of whether or not the leading end of the film is already connected to the core of the takeup spool 4 and also regardless of whether or not the spool 4 is allowed to recoil and to pay out a short length of film which has been collected on its core. Such recoiling may be due to a certain amount of play in the drive for the takeup spool. 4. When the leading end of the film 13 is properly anchored in the core of the spool 4, the operator closes the lid 33 and introduces the cartridge 2 into the chamber 1a by moving the cartridge in a direction at right angles to the plane of FIG. 1, i.e., in a direction from the left to the right, as viewed in FIG. 2. The gate 9, the sound head 15 and the sound wheel 17 automatically enter the cutout 40 provided therefor in the cartridge 2. Such cutout is preferably bounded by rounded edges to facilitate insertion of the cartridge without causing damage to the parts which must enter the cutout. It will be seen that the two portions of the film channel 2a which are located at the opposite sides of the deflector 10 are disposed in planes which make an angle of ninety degrees with each other. The detent pin 29 is disengaged from the film 13 when the operator moves the cover 26 to closing position. Such closing of the cover 26 also results in rocking of the lever 22 in a sense to move the parts 14, 16, 18 and 19 to operative positions.

It will be readily understood that the aforedescribed construction of the cartridge 2 enables the operator to rapidly and accurately insert the cartridge into a motion picture projector. Insertion of the cartridge 2 into the camera housing 1 or into the housing of a motion picture projector automatically results in proper engagement of the film 13 with all such parts which are needed to insure proper exposure, proper projection of images and proper sound effect. A very important advantage of the cartridge 2 is that the film 13 is running very quietly despite the fact that the distance between the pressing plate 7 and the sound head 15 is rather short. This is due to the fact that the portions of film 13 at the opposite sides of the deflector 10 are located in two planes which make substantially or exactly right angles with each other. In other words, the plane of that portion of the film which extends between the gate 9 and the deflector 10 makes right angles with the plane of the film portion extending between the deflector 10 and sound head 15. Consequently, any vibrations or shocks which develop in the region of the pressing plate 7 when the film 13 is intermittently advanced by the customary claw pull-down or the like cannot be propagated around the deflector 10. The overall length of the film between the pressing plate 7 and the sound head 15 is rather small without in any way affecting the operation of the motion picture camera. For example, the length of the loop between the plate 7 and sound head 15 may equal the combined length of eighteen film frames. In many heretofore known motion picture cameras, the length of the loop must equal the combined length of fifty-six film frames which is undesirable because it affects the synchronization of pictures with sound. Furthermore, the shorter the loop, the smaller is the cartridge which again, constitutes a highly desirable feature in a portable motion picture camera.

Many presently known cartridges for motion picture cameras are provided with special loop forming devices which can form a loop of desired length, even a loop with a length of eighteen film frames plus or minus one frame. However, such conventional loop formers are too expensive for use on cartridges which are removably inserted in the camera housing. The deflector or loop former 10 of my improved cartridge can be produced and installed at a very low cost. This deflector need not necessarily resemble a substantially U-shaped body but may also resemble a roller, a runner or the like.

The film portion which extends through the channel 2a tends to curl and thus contributes to the formation of a satisfactory loop. Therefore, the bias of the spring 11 which urges the deflector 10 to its outer end position can be very weak so that such bias can be overcome by slight tensioning of the film. This reduces noise when the film is being advanced in stepwise (pulsating) fashion. Furthermore, the weak spring 11 protects against excessive stresses that portion of the film 13 which is adjacent to the sound head 15. It will be seen that the film can pulsate freely in one direction, namely, in a direction to move away from the deflector 10. However, it is equally possible to utilize a deflector which is biased from two directions so that it automatically tends to assume a median or neutral position. Such modified deflector will engage the film from two sides so that the film must overcome the bias of one spring whenever it advances through the channel 2a. On the other hand, such mounting of the deflector insures that the latter remains in practically constant engagement with the film so that the generation of noise is practically nil.

It is further clear that, instead of being controlled by the cam 31 or by the disengaging element 32, the detent pin 29 for the film 13 may be disengaged from perforations in response to manipulation of a separate control element which is provided on the housing 1 and is manipulated by the operator after the cartridge 2 is properly accommodated and sealed in the housing 1.

What is claimed as new and desired to be protected by Letters Patent is:

1. In an apparatus of the character described, particularly in a motion picture camera or motion picture projector for use with roll film having a sound track, a housing having a chamber; a film cartridge removably received in said chamber, said cartridge having a film channel including two mutually inclined portions, a window adjacent to one of said portions, and a cutout adjacent to the other portion; coaxial film supply and takeup spools rotatably mounted in the cartridge; a pressing plate for urging the film coming from said supply spool against said window; a sound head mounted in said housing and extending into said cutout; detent means for engaging the film in said channel at a point which is distant from said window when said cartridge is removed from the chamber of said housing; disengaging means for disengaging said detent means from the film in response to proper insertion and sealing of the cartridge in said chamber; and carrier means provided in said housing and movable with reference to said cartridge in response to insertion and sealing of the cartridge in said chamber, said carrier means being operatively connected with said disengaging means in such a way that said detent means is disengaged from the film in automatic response to movement of said carrier means with reference to the cartridge.

2. In an apparatus of the character described, particularly in a motion picture camera or motion picture projector for use with roll film having a sound track, a housing having a chamber; a film cartridge removably received in said chamber, said cartridge having a film channel including two mutually inclined portions, a window adjacent to one of said portions, and a cutout adjacent to the other portion; coaxial film supply and takeup spools rotatably mounted in the cartridge; a pressing plate for urging the film coming from said supply spool against said window; a sound head mounted in said housing and extending into said cutout; detent means for engaging the film in said channel at a point which is distant from said window when said cartridge is removed from the chamber of said housing; and disengaging means for disengaging said detent means from the film in response to proper insertion and sealing of the cartridge in said chamber, said housing comprising a cover movable to and from closing position in which the cover seals the cartridge in said chamber and said disengaging means comprising a follower provided on said detent means and a cam provided on said cover to displace said follower and to thereby disengage said detent means from the film when the cover is moved to closing position.

3. In an apparatus of the character described, particularly in a motion picture camera or motion picture projector for use with roll film having a sound track, a housing having a chamber; a film cartridge removably received in said chamber, said cartridge having a film channel including two mutually inclined portions, a window adjacent to one of said portions, and a cutout adjacent to the other portion; coaxial film supply and takeup spools rotatably mounted in the cartridge; a pressing plate for urging the film coming from said supply spool against said window; a sound head mounted in said housing and extending into said cutout; detent means for engaging the film in said channel at a point which is distant from said window when said cartridge is removed from the chamber of said housing, said detent means comprising a pin and means for biasing said pin into engagement with the film in said channel; disengaging means for disengaging said detent means from the film in response to proper insertion and sealing of the cartridge in said chamber;

and a carrier movably supported by said housing and comprising a motion transmitting element constituting said disengaging means and arranged to disengage the pin from the film in response to movement of said carrier with reference to said housing.

4. A structure as set forth in claim 3, wherein said carrier is a lever which is rockably supported by said housing and said housing comprises a cover movable to and from a closing position in which the cover seals the cartridge in said chamber, said cover being provided with means for rocking the lever with reference to said housing in response to movement to closing position whereby said motion transmitting element disengages said pin from the film in said channel.

References Cited
UNITED STATES PATENTS

| | | | |
|---|---|---|---|
| 3,176,310 | 3/1965 | Finnerty | 352—29 |
| 3,208,685 | 9/1965 | Edwards et al. | |
| 3,244,469 | 4/1966 | Hennessey et al. | 352—14 |
| 3,300,270 | 1/1967 | Finnerty | 352—29 |

FOREIGN PATENTS 1,001,502  10/1951  France.

JULIA E. COINER, *Primary Examiner.*

U.S. Cl. X.R.

352—72, 156